United States Patent
Cheon

(10) Patent No.: US 10,416,781 B2
(45) Date of Patent: Sep. 17, 2019

(54) LETTER INPUT METHOD USING TOUCHSCREEN

(71) Applicant: Tae Cheol Cheon, Gyeonggi-do (KR)

(72) Inventor: Tae Cheol Cheon, Gyeonggi-do (KR)

( * ) Notice: Subject to any disclaimer, the term of this patent is extended or adjusted under 35 U.S.C. 154(b) by 0 days.

(21) Appl. No.: 15/517,982

(22) PCT Filed: Oct. 14, 2015

(86) PCT No.: PCT/KR2015/010809
§ 371 (c)(1),
(2) Date: Apr. 10, 2017

(87) PCT Pub. No.: WO2016/060454
PCT Pub. Date: Apr. 21, 2016

(65) Prior Publication Data
US 2017/0285935 A1    Oct. 5, 2017

(30) Foreign Application Priority Data
Oct. 14, 2014   (KR) .................. 10-2014-0138075

(51) Int. Cl.
*G06F 3/023*   (2006.01)
*G06F 3/041*   (2006.01)
(Continued)

(52) U.S. Cl.
CPC ............ *G06F 3/0236* (2013.01); *G06F 3/018* (2013.01); *G06F 3/041* (2013.01); *G06F 3/04883* (2013.01); *G06F 3/04886* (2013.01)

(58) Field of Classification Search
CPC .... G06F 3/0236; G06F 3/041; G06F 3/04886; G06F 3/04883
See application file for complete search history.

(56) References Cited

U.S. PATENT DOCUMENTS 8,769,427 B2    7/2014 Raman et al.
2004/0104896 A1*  6/2004 Suraqui ................. G06F 3/0237
345/168

(Continued)

FOREIGN PATENT DOCUMENTS

JP         2010033272 A   *  2/2010
KR    10-2010-0044772 A      4/2010
(Continued)

OTHER PUBLICATIONS

Chen, Xiang 'Anthony' et al., "Swipeboard: A Text Entry Technique for Ultra-Small Interfaces That Supports Novice to Expert Transitions", UIST '14, Oct. 5-8, 2014.*

(Continued)

*Primary Examiner* — Michelle L Sams
(74) *Attorney, Agent, or Firm* — Maier & Maier, PLLC

(57) ABSTRACT

A letter input method using a touch screen allows an input action of a user to be recognized using basic slip actions in four directions perpendicular to each other and consecutive slip actions expansively consecutive therefrom, and a consecutive slip action is configured as a combination of actions slipping in a direction not overlapping with a former slip direction. Thus, each slip action may be clearly distinguished to fundamentally solve problems such as erroneous input, duplicated recognition caused by gestures (slips) performed at a border line, erroneous recognition or the like, thereby greatly improving the efficiency in inputting letters and also realizing an action recognition algorithm more conveniently and easily.

6 Claims, 8 Drawing Sheets

(A)

(B)

(C)

(51) Int. Cl.
  *G06F 3/0488* (2013.01)
  *G06F 3/01* (2006.01)

(56) References Cited

U.S. PATENT DOCUMENTS

| | | | | |
|---|---|---|---|---|
| 2005/0052431 A1* | 3/2005 | Chang | G06F 3/018 | 345/173 |
| 2007/0298785 A1* | 12/2007 | Lee | G06F 3/018 | 455/425 |
| 2008/0158024 A1* | 7/2008 | Steiner | G06F 3/0234 | 341/34 |
| 2009/0058823 A1* | 3/2009 | Kocienda | G06F 3/0236 | 345/173 |
| 2010/0289750 A1* | 11/2010 | Kim | G06F 3/018 | 345/173 |
| 2010/0333011 A1* | 12/2010 | Kornev | G06F 3/04886 | 715/773 |
| 2011/0071818 A1* | 3/2011 | Jiang | G06F 3/0236 | 704/8 |
| 2011/0210850 A1* | 9/2011 | Tran | G06F 3/04883 | 340/540 |
| 2011/0302518 A1* | 12/2011 | Zhang | G06F 3/0234 | 715/773 |
| 2012/0306769 A1* | 12/2012 | Zhu | G06F 3/04883 | 345/173 |
| 2013/0339895 A1* | 12/2013 | Hirshberg | G06F 3/04886 | 715/773 |
| 2014/0164973 A1* | 6/2014 | Greenzeiger | G06F 3/04886 | 715/773 |
| 2016/0034181 A1* | 2/2016 | Norris, III | G06F 3/0236 | 715/773 |
| 2016/0041965 A1* | 2/2016 | Ghassabian | G06F 3/005 | 715/261 |

FOREIGN PATENT DOCUMENTS

| | | |
|---|---|---|
| KR | 10-2011-0014891 A | 2/2011 |
| KR | 10-2011-0083086 A | 7/2011 |
| KR | 10-2012-0099987 A | 9/2012 |

OTHER PUBLICATIONS

Chen, Xian 'Anthony' et al., "Swipeboard: A Text Entry Technique for Ultra-Small Interfaces That Supports Novice to Expert Transitions," UIST '14, Oct. 5-8, 2014. (Year: 2014).*

International Search Report dated Feb. 18, 2016 in corresponding PCT/KR2015/010809; 2 pgs.

\* cited by examiner

LETTER INPUT METHOD USING TOUCHSCREEN

TECHNICAL FIELD

The present disclosure relates to a letter input method using a touch screen, and a terminal including the same, and more particularly, has a feature in that letters corresponding to a touch action, a basic slip action and a consecutive slip action of a user are input.

BACKGROUND ART

Generally, if a finger or article touches a specific location of a touch screen, the touch screen checks the location and transfers it to a controller. A terminal equipped with the touch screen outputs various images on the touch screen according to a function demanded by the user and figures out an image touched by the user to perform the corresponding function.

When an input function is performed using a soft keyboard on a touch screen of a smartphone or a tablet PC, a key button is touched to input a letter, and here a broad display area should be ensured since a letter input function and a screen display function should be realized together.

However, in most cases, the soft keyboard occupies about a half of the entire area of the touch screen, and even though the significant area of the touch screen is occupied, each key button is so small to cause touch errors frequently.

In addition, in order to input a word, various key buttons should be pressed on the soft keyboard. However, as the soft keyboard has a greater area, the finger should be moved longer, which consumes much time for input.

Korean Unexamined Patent Publication No. 10-2011-0137128 discloses a letter input method, which is however not available for other languages than Korean, and a user should be acquainted with various input methods in order to input vowels of Korean language.

DISCLOSURE

Technical Problem

Embodiments of the present disclosure are directed to providing a letter input method, which may ensure a broad display area at a terminal and allow fast and convenient input of letters, and a terminal including the same.

Technical Solution

In one aspect of the present disclosure, there is provided a letter input method using a touch screen, comprising: a soft keyboard displaying step for distinguishably displaying an input window region and a soft keyboard region on the touch screen; a key button displaying step for displaying key buttons on which some letters corresponding to an action of a user are arranged, in the soft keyboard region; an action recognizing step for recognizing an input action of the user at the key buttons; and a letter inputting step for inputting a letter corresponding to any one of a touch action, a basic slip action and a consecutive slip action, or a combination thereof, in the recognized input action, wherein in the letter inputting step, the touch action includes an action of pressing and then releasing a key button in the soft keyboard region, an action of pressing and then releasing a key button in the soft keyboard region several times within a critical time, or an action of pressing a key button in the soft keyboard region over the critical time, wherein in the letter inputting step, the basic slip action includes an action of slipping at a key button in the soft keyboard region in a first direction, in a second direction opposite to the first direction, in a third direction perpendicular to the second direction or in a fourth direction opposite to the third direction, and wherein in the letter inputting step, the consecutive slip action includes a first consecutive slip action or an $n^{th}$ (n is a natural number of 2 or above) consecutive slip action for consecutively slipping at the key button in any one of three directions, which excludes the slip direction of the former basic slip action among the first to fourth directions, in a state where the key button is continuously pressed, after the basic slip action is completed, and the $n^{th}$ consecutive slip action includes an action of consecutively slipping at the key button in any one of three directions, which excludes the slip direction of the $n-1^{th}$ consecutive slip action among the first to fourth directions, in a state where the key button is continuously pressed, after the $n-1^{th}$ consecutive slip action is completed.

In addition, the touch action of the present disclosure may allow the same letter to be input regardless of a pressed location within the key button, and the first direction of the basic slip action of the present disclosure may be rotatable within 90 degrees.

In order to implement a more preferred embodiment, in the present disclosure, 26 alphabets may be disposed in two or less key buttons so that a letter corresponding to any one of the touch action, the basic slip action and the consecutive slip action is input.

In addition, the basic slip action and the consecutive slip action of the present disclosure may allow slip to start within the key button in the soft keyboard region and to end within or out of the key button.

Advantageous Effects

The present disclosure gives the following effects.

First, the number of key buttons at a soft keyboard may be reduced, and a user may input letters arranged on the key button without seeing the arrangement of letters.

Second, since the number of key buttons decreases, an area of the soft keyboard on a touch screen may be reduced, which may ensure a broad display area on the screen.

Third, since the key button may have an enlarged size in comparison to an existing soft keyboard, touch errors may be reduced.

Fourth, since the number of key buttons decreases, a moving distance of the finger may be reduced, which allows fast input of letters.

BEST MODE

Figure 1:
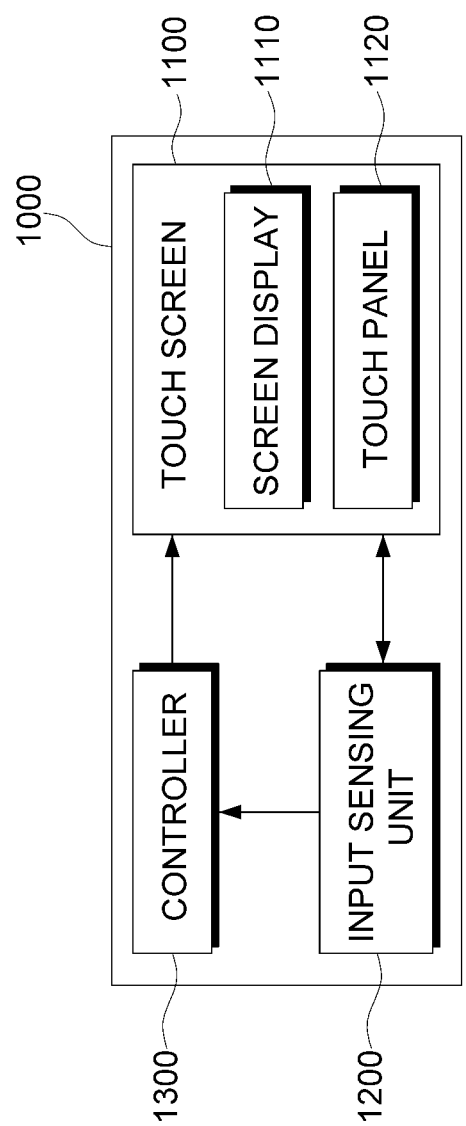
FIG. 1 is a diagram showing a detailed configuration of a terminal to which a letter input method according to an embodiment of the present disclosure is applied.

Hereinafter, an embodiment of the present disclosure will be described in detail with reference to the accompanying drawings so that the present disclosure can be easily implemented by those having ordinary skill in the art. However, the present disclosure may be implemented in various different ways, without being limited to the embodiment described herein. In addition, in the drawings, any portion or region having no relation with the description is not depicted for clearer understanding of the present disclosure, and throughout the entire specification, like elements are designated by like reference signs.

Hereinafter, referring to FIGS. 1 to 8, a letter input method using a touch screen according to an embodiment of the present disclosure and a terminal including the same will be described.

FIG. 1 is a diagram showing a detailed configuration of a terminal to which a letter input method according to an embodiment of the present disclosure is applied.

Referring to FIG. 1, the terminal 1000 includes a touch screen 1100, an input sensing unit 1200 and a controller 1300.

The touch screen 1100 includes a screen display 1110 and a touch panel 1120 installed on the screen display. The screen display 1110 displays various kinds of information such as a menu button for operating the terminal 1000, a soft keyboard, letters selected by a user, and so on.

The input sensing unit 1200 senses an action of a user, which is made to select a menu, data or letter displayed on the touch screen 1100. In detail, the input sensing unit 1200 senses a touch action S31, a basic slip action S32 and a consecutive slip action S33 by means of a touch sensor and transfers them to the controller 1300.

The controller 1300 controls overall operations of the terminal 1000 and controls the screen display 1110 based on the signal sensed by the input sensing unit 1200. In other words, the controller 1300 controls so that a letter corresponding to the touch action S31, the basic slip action S32 or the consecutive slip action S33 of a user is selected and input.

Figure 2:
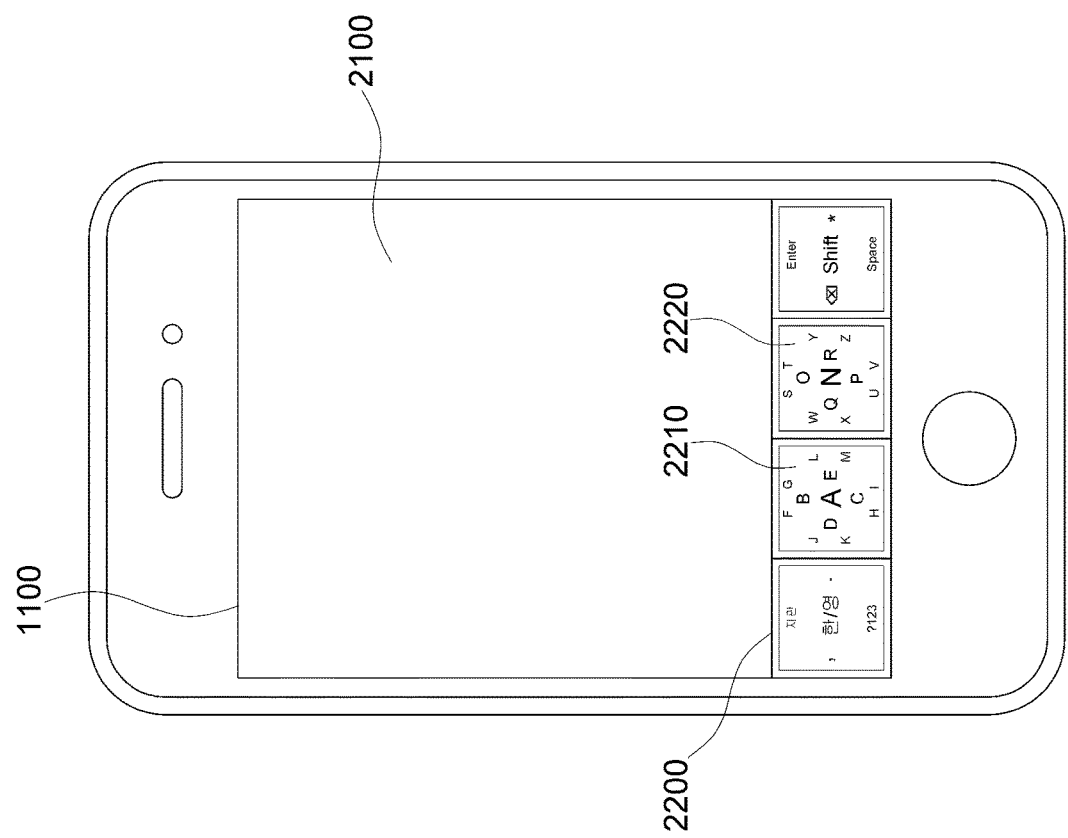
FIG. 2 is a diagram for illustrating a touch screen of the terminal to which the letter input method according to an embodiment of the present disclosure is applied.

FIG. 2 is a diagram for illustrating a touch screen 2000 of the terminal to which the letter input method according to an embodiment of the present disclosure is applied.

Referring to FIG. 2, the touch screen 1100 includes an input window region 2100 and a soft keyboard region 2200, and the soft keyboard region 2200 includes a plurality of key buttons.

The input window region 2100 displays a letter input corresponding to an action of a user.

The key button included in the soft keyboard region 2200 is prepared by intuitively arranging some letters corresponding to an action of a user, and an action of the user starts here. An input action starting within the key button ends within or out of the key button.

The arrangement and function of letters depicted in FIG. 2 are just an example, and the present disclosure is not limited thereto.

Figure 3:
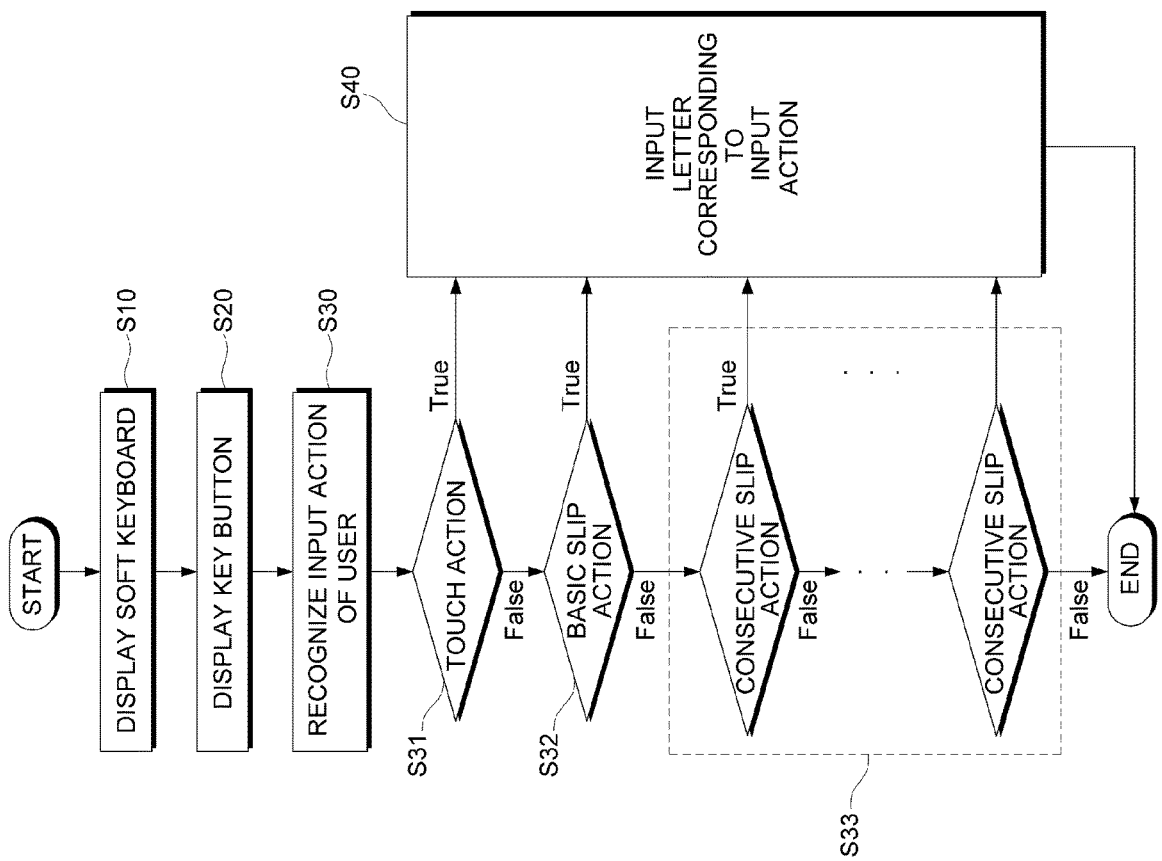
FIG. 3 is a flowchart for illustrating a letter input method according to an embodiment of the present disclosure.
Figure 4:
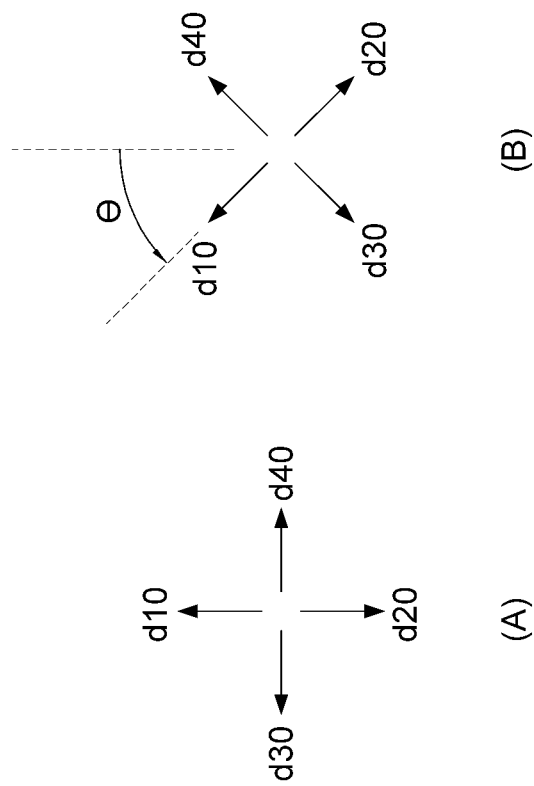
FIGS. 4(A) and 4(B) are diagrams for illustrating a basic slip action according to an embodiment of the present disclosure.
Figure 5:
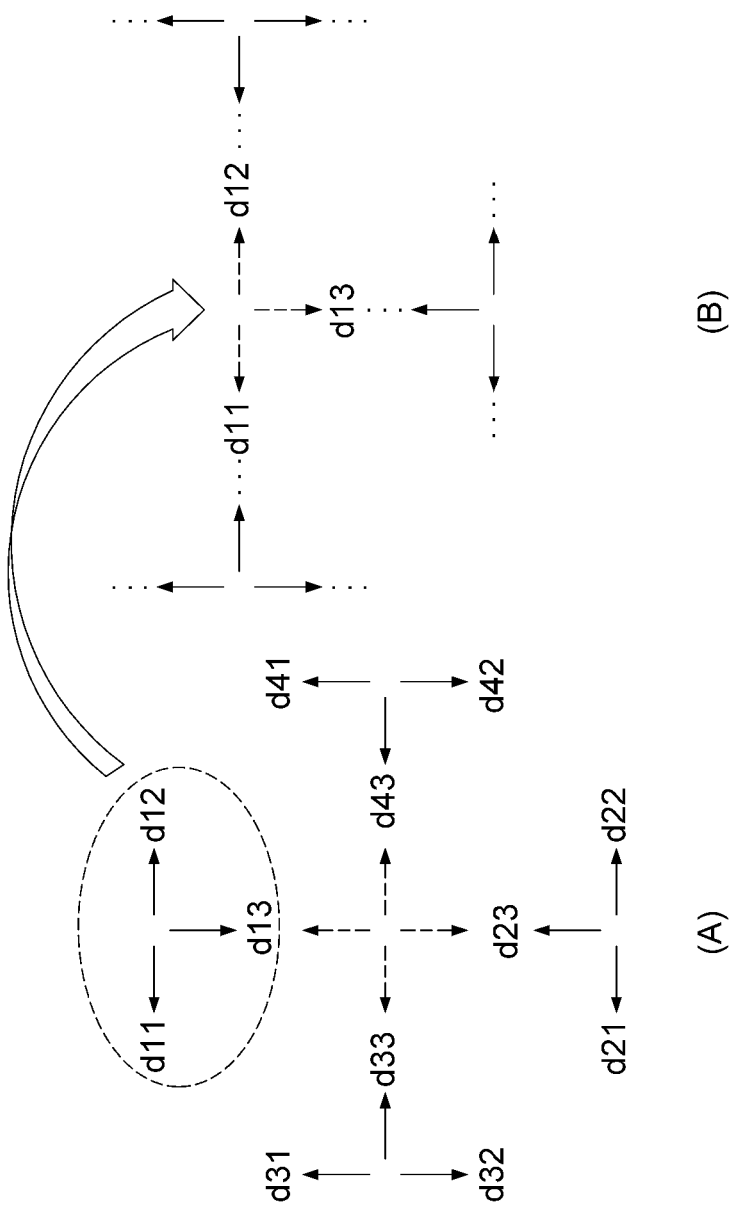
FIGS. 5(A) and 5(B) are diagrams for illustrating a consecutive slip action according to an embodiment of the present disclosure.
Figure 6:
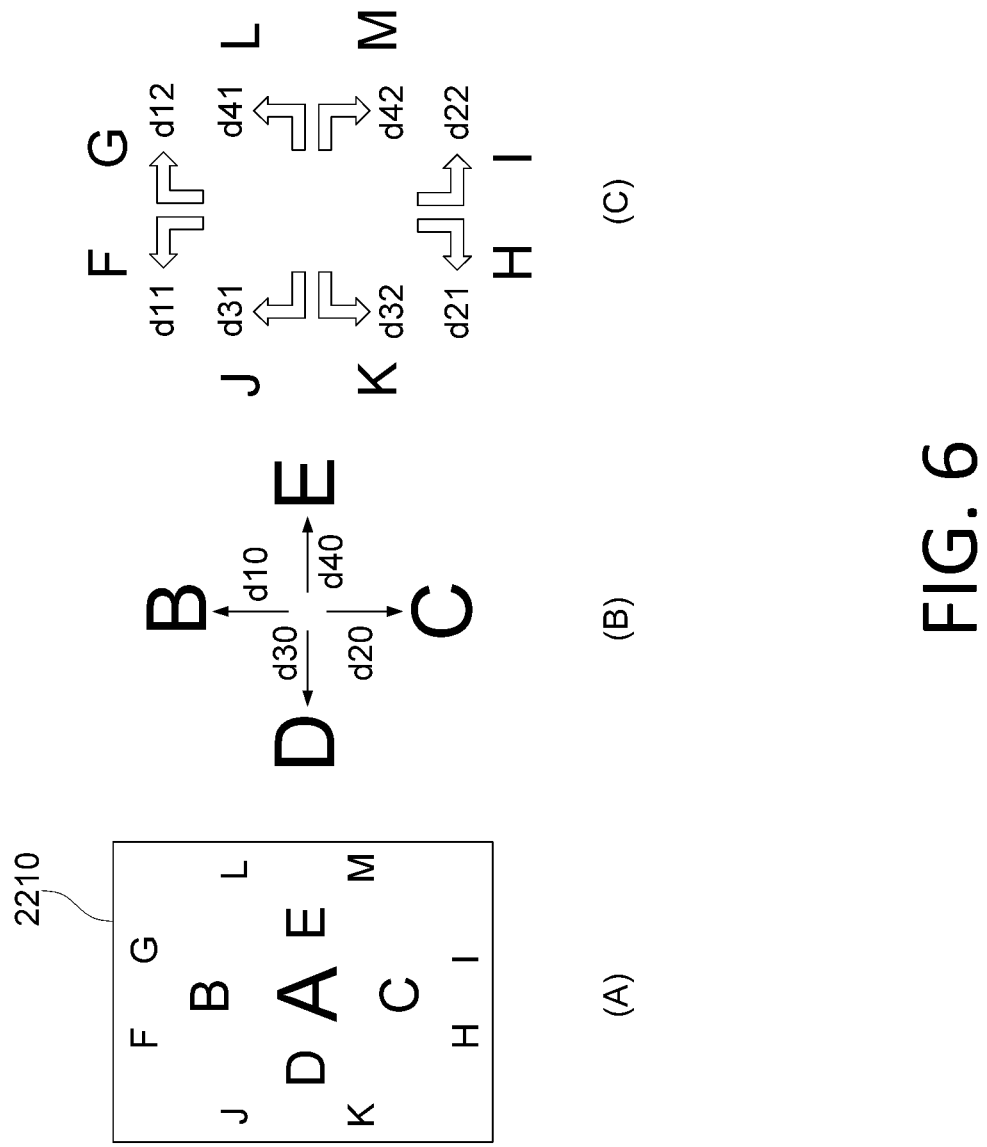
FIGS. 6(A), 6(B) and 6(C) are diagrams for illustrating an alphabet input method corresponding to a touch action, a basic slip action and a consecutive slip action according to an embodiment of the present disclosure.

FIG. 3 is a flowchart for illustrating a letter input method according to an embodiment of the present disclosure.

First, in Step S10, the input window region 2100 and the soft keyboard region 2200 are distinguishably displayed in a region of the touch screen 1100.

In Step S20, a key button in which some letters corresponding to an action of a user is displayed in the soft keyboard region 2200.

In Step S30, an input action of a user is recognized.

In Step S40, among the input actions recognized in Step S30, letters corresponding to the touch action S31, the basic slip action S32 and the consecutive slip action S33 are input.

The embodiment of the present disclosure can be implemented in the form of a computer-readable recording medium having computer-executable instructions such as program modules executed by a computer. The computer-readable recording medium may be any available medium accessible by a computer and includes all kinds of volatile and non-volatile mediums as well as distributed or non-distributed mediums. Also, the computer-readable recording medium may include all kinds of computer storage mediums and communication mediums. The computer storage medium includes all kinds of volatile and non-volatile mediums as well as distributed or non-distributed mediums, which are implemented using computer-readable instructions, data structures, program modules, or any other methods or techniques for storing information such as data. The communication medium typically includes data transmission mechanisms for computer-readable instructions, data structures, program modules, or other modulated data signals such as carriers, or other transmission mechanisms, and any information transmission medium can be employed.

FIGS. 4(A) and 4(B) are diagrams for illustrating a basic slip action according to an embodiment of the present disclosure.

Referring to FIG. 4(A), the basic slip action includes four actions for slipping in a first direction (d10), in a second direction (d20) opposite to the first direction (d10), in a third direction (d30) perpendicular to the second direction (d20), and in a fourth direction (d40) opposite to the third direction (d30).

Referring to FIG. 4(B), the first direction (d10) is rotatable with an angle (θ) of 90 degrees.

The basic slip action starts slip within the key button in the soft keyboard region 2200 and ends within or out of the key button.

FIGS. 5(A) and 5(B) are diagrams for illustrating a consecutive slip action according to an embodiment of the present disclosure.

Referring to FIG. 5(A), different letters may be input depending on the consecutive slip action.

The consecutive slip action includes 12 actions for consecutively slipping in one of three directions, which exclude the final action direction, in a state where the key button is continuously pressed, after the basic slip action is completed.

Referring to FIG. 5(B), after the consecutive slip action is completed, in a state where the key button is continuously pressed, an action of consecutively slipping in one of three directions except for the final action direction may be repeated.

By means of the repeated consecutive slip action, 12×n (n is a repetition frequency) actions may be added.

The consecutive slip action starts slip within the key button in the soft keyboard region 2200 and ends within or out of the key button.

FIGS. 6(A), 6(B) and 6(C) are diagrams for illustrating an alphabet input method corresponding to a touch action, a basic slip action and a consecutive slip action according to an embodiment of the present disclosure.

Referring to FIGS. 6(A), 6(B) and 6(C), 13 different letters may be input corresponding to the touch action, the basic slip action and the consecutive slip action.

Hereinafter, referring to FIGS. 6(A), 6(B) and 6(C), a letter input method according to an embodiment of the present disclosure will be described.

Referring to FIG. 6(A), 'A' may be input corresponding to a touch action.

The touch action may be realized by pressing and then releasing a key button A 2210, or pressing and then releasing the key button A 2210 several times within a critical time, or pressing the key button A 2210 over the critical time.

The touch action allows the same letter to be input regardless of a pressing location within the key button A 2210.

Referring to FIG. 6(B), if the key button A 2210 slips in an upper direction (d10), a letter 'B' is input corresponding thereto, and if slipping in a lower direction (d20), a letter 'C' is input corresponding thereto, and if slipping in a left direction (d30), a letter 'D' is input corresponding thereto, and if slipping in a right direction (d40), a letter 'E' is input corresponding thereto.

Referring to FIG. 6(C), if the key button A 2210 slips in an upper direction and then consecutively slips in a left direction (d11), a letter 'F' is input corresponding thereto, and if slipping in an upper direction and then consecutively slipping in a right direction (d12), a letter 'G' is input corresponding thereto, and if slipping in a lower direction and then consecutively slipping in a left direction (d21), a letter 'H' is input corresponding thereto, and if slipping in a lower direction and then consecutively slipping in a right direction (d22), a letter 'I' is input corresponding thereto, if slipping in a left direction and then consecutively slipping in an upper direction (d31), a letter T is input corresponding thereto, and if slipping in a left direction and then consecutively slipping in a lower direction (d32), a letter 'K' is input corresponding thereto, and if slipping in a right direction and then consecutively slipping in an upper direction (d41), a letter is input corresponding thereto, and if slipping in a right direction and then consecutively slipping in a lower direction (d42), a letter 'M' is input corresponding thereto.

The arrangement and function of letters depicted in FIGS. 6(A), 6(B) and 6(C) are just an example, and the present disclosure is not limited thereto.

Figure 7:
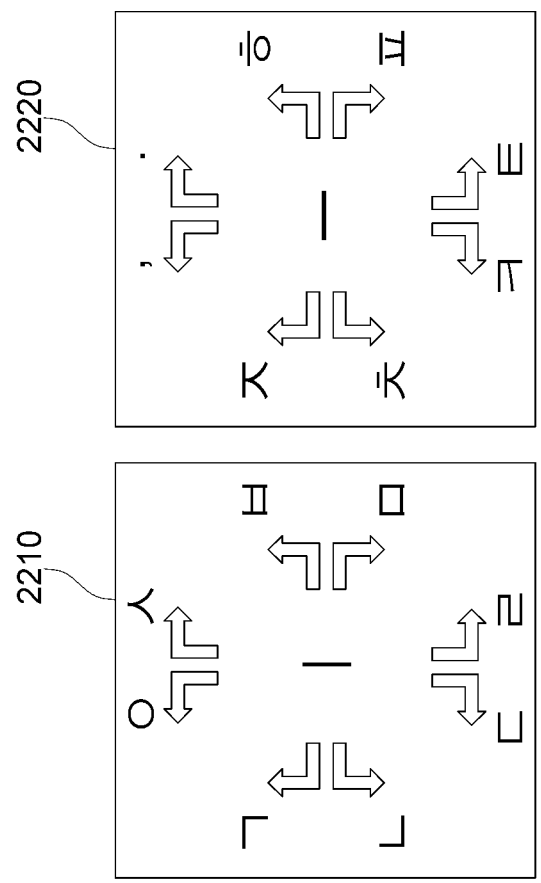
FIG. 7 is a diagram for illustrating a Korean consonant input method corresponding to a consecutive slip action according to an embodiment of the present disclosure.

FIG. 7 is a diagram for illustrating a Korean consonant input method corresponding to a consecutive slip action according to an embodiment of the present disclosure.

Referring to FIG. 7, 14 consonants may be arranged in two key buttons.

Hereinafter, referring to FIG. 7, a Korean consonant input method according to an embodiment of the present disclosure will be described.

14 consonants 'ㄱ', 'ㄴ', 'ㄷ', 'ㄹ', 'ㅁ', 'ㅂ', 'ㅅ', 'ㅇ', 'ㅈ', 'ㅊ', 'ㅋ', 'ㅌ', 'ㅍ' and 'ㅎ' are input corresponding to the consecutive slip actions.

If the key button A 2210 slips in an upper direction and then consecutively slipping in a left direction, a letter 'ㅇ' is input corresponding thereto, and if slipping in an upper direction and then consecutively slipping in a right direction, a letter 'ㅅ' is input corresponding thereto, and if slipping in a lower direction and then consecutively slipping in a left direction, a letter 'ㄷ' is input corresponding thereto, lower direction and then consecutively slipping in a right direction, a letter 'ㄹ' is input corresponding thereto, and if slipping in a left direction and then consecutively slipping in an upper direction, a letter 'ㄱ' is input corresponding thereto, and if slipping in a left direction and then consecutively slipping in a lower direction, a letter 'ㄴ' is input corresponding thereto, and if slipping in a right direction and then consecutively slipping in an upper direction, a letter 'ㅂ' is input corresponding thereto, and if slipping in a right direction and then consecutively slipping in a lower direction, a letter 'ㅁ' is input corresponding thereto.

If the key button B 2220 slips in a lower direction and then consecutively slipping in a left direction, a letter 'ㅋ' is input corresponding thereto, and if slipping in a lower direction and then consecutively slipping in a right direction, a letter 'ㅌ' is input corresponding thereto, and if slipping in a left direction and then consecutively slipping in an upper direction, a letter 'ㅈ' is input corresponding thereto, and if slipping in a left direction and then consecutively slipping in a lower direction, a letter 'ㅊ' is input corresponding thereto, and if slipping in a right direction and then consecutively slipping in an upper direction, a letter 'ㅎ' is input corresponding thereto, and if slipping in a right direction and then consecutively slipping in a lower direction, a letter 'ㅍ' is input corresponding thereto.

Double consonant 'ㄲ', 'ㄸ', 'ㅃ', 'ㅆ' 'ㅉ' not displayed in the key button A 2210 and the key button B 2220 are input by inputting the corresponding consonant successively or input corresponding to a consecutive slip action as in Table 1 below.

TABLE 1

| slip order | first | second | third |
|---|---|---|---|
| ㄲ | key button A, left | key button A, upper | key button A, left |
| ㄸ | key button A, lower | key button A, left | key button A, lower |
| ㅃ | key button A, right | key button A, upper | key button A, right |
| ㅆ | key button A, upper | key button A, right | key button A, upper |
| ㅉ | key button B, left | key button B, upper | key button B, left |

Final double consonants 'ㄳ', 'ㄵ', 'ㄶ', 'ㄺ', 'ㄽ', 'ㄾ', 'ㅀ', 'ㅄ', 'ㄷ', 'ㄼ' 'ㄽ' 'ㄿ' not displayed in the key button A 2210 and the key button B 2220 are input by inputting consonants successively or input corresponding to a consecutive slip action as in Table 2 below.

TABLE 2

| slip order | first | second | third |
|---|---|---|---|
| ㄳ | key button A, left | key button A, upper | key button A, right |
| ㄵ | key button B, left | key button B, upper | key button B, right |
| ㄶ | key button A, left | key button A, lower | key button A, right |
| ㄺ | key button A, lower | key button A, right | key button A, upper |
| ㄽ | key button A, upper | key button A, right | key button A, lower |
| ㄾ | key button B, lower | key button B, right | key button B, upper |
| ㅀ | key button B, right | key button B, upper | key button B, left |
| ㅄ | key button A, right | key button A, upper | key button A, left |
| ㄷ | key button B, lower | key button B, left | key button B, upper |
| ㄼ | key button A, right | key button A, lower | key button A, left |
| ㄿ | key button B, right | key button B, lower | key button B, left |

The arrangement and function of letters depicted in FIG. 7 are just an example, and the present disclosure is not limited thereto.

Figure 8:
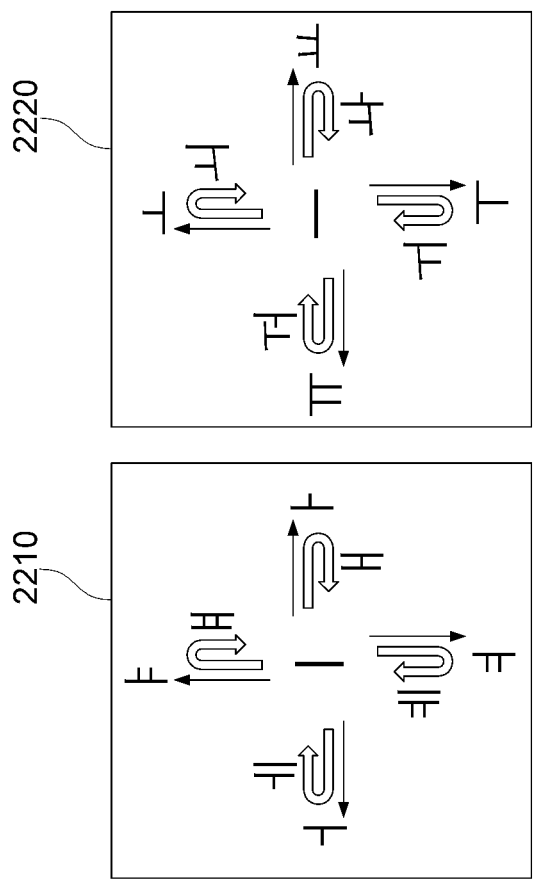
FIG. 8 is a diagram for illustrating a Korean vowel input method corresponding to a touch action, a basic slip action and a consecutive slip action according to an embodiment of the present disclosure.

FIG. 8 is a diagram for illustrating a Korean vowel input method corresponding to a touch action, a basic slip action and a consecutive slip action according to an embodiment of the present disclosure.

Among basic vowels, 'ㅣ' and 'ㅡ' are input corresponding to the touch action, and the other eight basic vowels 'ㅓ', 'ㅏ', 'ㅑ', 'ㅕ', 'ㅠ', 'ㅛ', 'ㅗ' and 'ㅜ' are input corresponding to the basic slip action.

If the key button A 2210 slips in an upper direction, a letter 'ㅏ' is input corresponding thereto, and if slipping in a lower direction, a letter 'ㅓ' is input corresponding thereto, and if slipping in a left direction, a letter 'ㅓ' is input corresponding thereto, and if slipping in a right direction, a letter 'ㅏ' is input corresponding thereto.

If the key button B 2220 slips in an upper direction, a letter 'ㅗ' is input corresponding thereto, and if slipping in a lower direction, a letter 'ㅜ' is input corresponding thereto, and if slipping in a left direction, a letter 'ㅠ' is input corresponding thereto, and if slipping in a right direction, a letter 'ㅛ' input corresponding thereto.

Complex vowels 'ㅐ', 'ㅒ', 'ㅔ', 'ㅖ', 'ㅘ', 'ㅙ', 'ㅚ', 'ㅝ', 'ㅞ' and 'ㅟ' not displayed in the key button A 2210 and the key button B 2220 are input by inputting basic vowels successively or input corresponding to a consecutive slip action as in Table 2 below.

TABLE 3

| slip order | first | second | third |
|---|---|---|---|
| ㅐ | key button A, right | key button A, left | — |
| ㅒ | key button A, upper | key button A, lower | — |
| ㅔ | key button A, left | key button A, right | — |
| ㅖ | key button A, lower | key button A, upper | — |
| ㅘ | key button B, right | key button B, left | — |
| ㅙ | key button B, upper | key button B, lower | key button B, right |
| ㅚ | key button B, upper | key button B, lower | — |
| ㅝ | key button B, left | key button B, right | — |
| ㅞ | key button B, lower | key button B, upper | key button B, left |
| ㅟ | key button B, lower | key button B, upper | — |

A complex vowel 'ㅢ' not displayed in the key button A 2210 and the key button B 2220 may be input by inputting basic vowels successively or input corresponding to the touch action at the key button A 2210 or the key button B 2220.

The arrangement and function of letters depicted in FIG. 8 are just an example, and the present disclosure is not limited thereto.

As described above, the consecutive slip action of the present disclosure is expanded in order, and a first consecutive slip action corresponds to an action of consecutively slipping at the key button in any one of three directions, which excludes the slip direction of the former basic slip action among the first to fourth directions, in a state where the key button is continuously pressed, after the basic slip action is completed.

A second consecutive slip action corresponds to an action of consecutively slipping at the key button in any one of three directions, which excludes the slip direction of the first consecutive slip action among the first to fourth directions, in a state where the key button is continuously pressed, after the first consecutive slip action is completed. Also, a third consecutive slip action corresponds to an action of consecutively slipping at the key button in any one of three directions, which excludes the slip direction of the second consecutive slip action among the first to fourth directions, in a state where the key button is continuously pressed, after the second consecutive slip action is completed.

Therefore, an $n^{th}$ (n is a natural number of 2 or above) consecutive slip action of the present disclosure may be defined as an action of consecutively slipping at the key button in any one of three directions, which excludes the slip direction of an $n-1^{th}$ consecutive slip action among the first to fourth directions, in a state where the key button is continuously pressed, after the $n-1^{th}$ consecutive slip action is completed.

As described above, the letter input method of the present disclosure may be applied to not only the Korean language but also various other languages having a plurality of alphabets or a letter system corresponding thereto.

The above disclosure is just an example, and it will be understood that the present disclosure can be easily modified in various ways without changing the technical features or essential techniques of the present disclosure by those having ordinary skill in the art. Therefore, the embodiments described above should be understood as being illustrative in every aspect, without being restrictive. For example, any component described as a single type can be implemented in a distributed type, and also components distributed can also be combined into a single unit.

The terminal may be a smartphone or a table PC, without being limited thereto.

The scope of the present disclosure is defined by the appended claims, and it should be interpreted that all changes and modifications derived from the meaning, scope and equivalents of the appended claims fall within the scope of the present disclosure.

What is claimed is:

1. A letter input method using a touch screen, comprising:
    a soft keyboard displaying step for distinguishably displaying an input window region and a soft keyboard region on the touch screen;
    a key button displaying step for displaying key buttons on which some letters corresponding to an action of a user are arranged, in the soft keyboard region;
    an action recognizing step for recognizing an input action of the user at the key buttons; and
    a letter inputting step for inputting a letter in the recognized input action,
    wherein the inputting the letter in the letter inputting step includes a touch action, a basic slip action and a consecutive slip action,
        wherein in the letter inputting step, the touch action includes an action of pressing and then releasing a key button in the soft keyboard region, an action of pressing and then releasing a key button in the soft keyboard region several times within a critical time, or an action of pressing a key button in the soft keyboard region over the critical time,
        wherein in the letter inputting step, the basic slip action includes an action of slipping at a key button in the soft keyboard region in a first direction, in a second direction opposite to the first direction, in a third direction perpendicular to the second direction or in a fourth direction opposite to the third direction, and
        wherein in the letter inputting step, the consecutive slip action includes a first consecutive slip action or an $n^{th}$ (n is a natural number of 2 or above) consecutive slip action for consecutively slipping at the key button in any one of three directions, which excludes the slip direction of a former basic slip action among the first to fourth directions, in a state where the key button is continuously pressed, after the former basic slip action is completed, and the $n^{th}$ consecutive slip action includes an action of consecutively slipping at the key button in any one of three directions, which excludes the slip direction of the $n-1^{th}$ consecutive slip action among the first to fourth directions, in a state where the key button is continuously pressed, after the $n-1^{th}$ consecutive slip action is completed.

2. The letter input method using a touch screen according to claim 1,
wherein the touch action allows the same letter to be input regardless of a pressed location within the key button.

3. The letter input method using a touch screen according to claim 1,
wherein the first direction of the basic slip action is rotatable within 90 degrees.

4. The letter input method using a touch screen according to claim 1,
wherein 26 alphabets are disposed in two or less key buttons so that a letter corresponding to any one of the touch action, the basic slip action and the consecutive slip action is input.

5. The letter input method using a touch screen according to claim 1,
wherein the basic slip action and the consecutive slip action allows slip to start within the key button in the soft keyboard region and to end within or out of the key button.

6. A computer-readable recording medium, on which a program for executing the method defined in claim 1 is recorded.

* * * * *